United States Patent
Beach et al.

(10) Patent No.: US 12,098,079 B2
(45) Date of Patent: *Sep. 24, 2024

(54) CHEMICAL REACTOR WITH INTEGRATED HEAT EXCHANGER, HEATER, AND HIGH CONDUCTANCE CATALYST HOLDER

(71) Applicant: Starfire Energy, Denver, CO (US)

(72) Inventors: Joseph D. Beach, Aurora, CO (US); Jonathan D. Kinter, Aurora, CO (US); Adam W. Welch, Aurora, CO (US)

(73) Assignee: STARFIRE ENERGY, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/672,843

(22) Filed: Feb. 16, 2022

(65) Prior Publication Data
US 2022/0289583 A1 Sep. 15, 2022

Related U.S. Application Data

(63) Continuation of application No. 16/766,045, filed as application No. PCT/US2018/062295 on Nov. 21, 2018, now Pat. No. 11,286,169.
(Continued)

(51) Int. Cl.
  *B01J 19/00* (2006.01)
  *B01J 8/02* (2006.01)
  (Continued)

(52) U.S. Cl.
  CPC .......... *C01C 1/0417* (2013.01); *B01J 8/0278* (2013.01); *B01J 8/0285* (2013.01); *B01J 12/007* (2013.01);
  (Continued)

(58) Field of Classification Search
  CPC .... C01C 1/0417; C01C 1/0411; B01J 8/0278; B01J 8/0285; B01J 12/007; B01J 19/0013; B01J 2208/065; B01J 2219/00135; B01J 2208/00203; B01J 2208/00415; B01J 2208/00495; B01J 2208/00884;
  (Continued)

(56) References Cited

U.S. PATENT DOCUMENTS

| | | |
|---|---|---|
| 2,898,183 A | 8/1959 | Giacomo |
| 3,344,052 A | 9/1967 | Yeh |

(Continued)

FOREIGN PATENT DOCUMENTS

| | | | |
|---|---|---|---|
| CN | 2318593 Y | * | 5/1999 |
| CN | 103237599 A | | 8/2013 |

(Continued)

OTHER PUBLICATIONS

US 8,585,996 B2, 11/2013, Nakamura et al. (withdrawn)
(Continued)

*Primary Examiner* — Huy Tram Nguyen
(74) *Attorney, Agent, or Firm* — Holzer Patel Drennan

(57) ABSTRACT

A chemical reactor that combines a pressure vessel, heat exchanger, heater, and catalyst holder into a single device is disclosed. The chemical reactor described herein reduces the cost of the reactor and reduces its parasitic heat losses. The disclosed chemical reactor is suitable for use in ammonia ($NH_3$) synthesis.

14 Claims, 5 Drawing Sheets

Related U.S. Application Data

(60) Provisional application No. 62/590,570, filed on Nov. 25, 2017.

(51) Int. Cl.
*B01J 12/00* (2006.01)
*C01C 1/04* (2006.01)
*F28D 9/00* (2006.01)
*F28D 9/04* (2006.01)
*F28D 21/00* (2006.01)

(52) U.S. Cl.
CPC ......... *B01J 19/0013* (2013.01); *C01C 1/0411* (2013.01); *F28D 9/0093* (2013.01); *F28D 9/04* (2013.01); *B01J 2208/065* (2013.01); *B01J 2219/00135* (2013.01); *F28D 2021/0022* (2013.01)

(58) Field of Classification Search
CPC ...... B01J 19/2485; B01J 8/0214; B01J 8/025; B01J 21/02; B01J 23/02; B01J 23/745; F28D 9/0093; F28D 9/04; F28D 2021/0022; Y02P 20/52
USPC ........................................................ 422/148
See application file for complete search history.

(56) References Cited

U.S. PATENT DOCUMENTS

| | | |
|---|---|---|
| 3,395,982 A | 8/1968 | Didycz |
| 3,519,546 A | 7/1970 | Lee |
| 3,721,532 A | 3/1973 | Wright et al. |
| 3,932,139 A | 1/1976 | Vilceanu et al. |
| 4,215,099 A | 7/1980 | Pinto et al. |
| 4,312,640 A | 1/1982 | Verrando |
| 4,322,394 A | 3/1982 | Mezey et al. |
| 4,537,760 A | 8/1985 | Lavie |
| 4,567,315 A | 1/1986 | Owaysi et al. |
| 5,268,091 A | 12/1993 | Boitiaux et al. |
| 5,282,886 A | 2/1994 | Kobayashi et al. |
| 5,326,537 A | 7/1994 | Cleary |
| 5,584,175 A * | 12/1996 | Carlborg .............. B01J 35/0033 422/177 |
| 5,711,926 A | 1/1998 | Knaebel |
| 6,471,932 B1 | 10/2002 | Gieshoff et al. |
| 6,609,570 B2 | 8/2003 | Wellington et al. |
| 6,712,950 B2 | 3/2004 | Denvir et al. |
| 6,739,394 B2 | 5/2004 | Vinegar et al. |
| 6,746,650 B1 | 6/2004 | Lesieur |
| 6,881,308 B2 | 4/2005 | Denvir et al. |
| 7,314,544 B2 | 1/2008 | Murphy et al. |
| 8,028,957 B2 | 10/2011 | Cleary |
| 8,038,957 B1 | 10/2011 | Cleary |
| 8,623,313 B2 | 1/2014 | Nakamura et al. |
| 8,789,586 B2 | 7/2014 | De et al. |
| 9,108,175 B2 | 8/2015 | Schwefer et al. |
| 9,108,858 B2 | 8/2015 | McDonald et al. |
| 9,217,068 B2 | 12/2015 | D'Souza et al. |
| 9,359,867 B2 | 6/2016 | Pennewitz et al. |
| 11,286,169 B2 * | 3/2022 | Beach .................. B01J 19/2485 |
| 11,325,105 B2 | 5/2022 | Beach et al. |
| 2001/0018039 A1 | 8/2001 | Gam |
| 2002/0028171 A1 | 3/2002 | Goetsch et al. |
| 2003/0211026 A1 | 11/2003 | Moore |
| 2004/0039514 A1 | 2/2004 | Steichen et al. |
| 2005/0247050 A1 | 11/2005 | Kaboord et al. |
| 2006/0002046 A1 | 1/2006 | Frandcis |
| 2006/0039847 A1 | 2/2006 | Kaboord et al. |
| 2006/0204651 A1 | 9/2006 | Wai et al. |
| 2008/0193360 A1 | 8/2008 | Holbrook et al. |
| 2012/0308467 A1 | 12/2012 | Carpenter et al. |
| 2013/0183224 A1 | 7/2013 | Hosono et al. |
| 2013/0224476 A1 | 8/2013 | Zheng et al. |
| 2014/0140911 A1 | 5/2014 | Bergeal et al. |
| 2015/0184281 A1 | 7/2015 | Ito et al. |
| 2015/0217278 A1 | 8/2015 | Hosono et al. |
| 2015/0239747 A1 | 8/2015 | Hosono et al. |
| 2015/0353369 A1 | 12/2015 | Sekine et al. |
| 2016/0271595 A1 | 9/2016 | Chen et al. |
| 2017/0087537 A1 * | 3/2017 | Zhang ................. B01J 37/0236 |
| 2017/0088433 A1 | 3/2017 | Kageyama et al. |
| 2017/0253492 A1 | 9/2017 | Beach et al. |
| 2020/0248606 A1 | 8/2020 | Joo et al. |

FOREIGN PATENT DOCUMENTS

| | | | |
|---|---|---|---|
| CN | 104445967 A | 3/2015 | |
| CN | 104445967 B * | 8/2016 | |
| EP | 1095906 A2 | 5/2001 | |
| EP | 3415805 A1 | 12/2018 | |
| JP | 2008013396 A | 1/2008 | |
| WO | 1998040311 A1 | 9/1998 | |
| WO | 2002016031 A2 | 2/2002 | |
| WO | 2002047804 | 6/2002 | |
| WO | WO-0247804 A1 * | 6/2002 | ............ B01J 8/0465 |
| WO | 2006099716 | 9/2006 | |
| WO | 2007104569 A1 | 9/2007 | |
| WO | 2010114386 A1 | 10/2010 | |
| WO | 2015177773 | 11/2015 | |
| WO | WO-2015177773 A1 * | 11/2015 | ............ B01J 23/002 |
| WO | 2018213305 A1 | 11/2018 | |
| WO | 2019104204 A1 | 5/2019 | |
| WO | 2021168226 A1 | 8/2021 | |

OTHER PUBLICATIONS

Kim, Sung-Wng, et al., "Fabrication of room temperature-stable 12CaO • 7Al2O3 electride: a review", Journal of Materials Science: Materials in Electronics, vol. 18, 2007, 5-14.
International Preliminary Report on Patentability for International (PCT) Patent Application No. PCT/US17/20201, dated Sep. 13, 2018, 10 pages.
International Preliminary Report on Patentability for International (PCT) Patent Application No. PCT/US18/32759, dated Aug. 1, 2018, 15 pages.
International Search Report and Written Opinion for International (PCT) Patent Application No. PCT/US17/20201, dated May 11, 2017, 10 pages.
International Search Report and Written Opinion for International (PCT) Patent Application No. PCT/US18/34637, dated Aug. 27, 2018, 9 pages.
"Comparative Quantitative Risk Analysis of Motor Gasoline, LPG, and Anhydrous Ammonia as an Automotive Fuel", Quest Consultants, Inc. Iowa State University, 59 pages., 2009.
"KAAPtm Ammonia Synthesis Converter", https://web.archive.org/web/2011015180221/http://www.kbr.com/Technologies/Proprietary-Equipment/KAAP-Ammonia-Synthesis-Converter/, 2011.
"Targets for Onboard Hydrogen Storage Systems for Light-Duty Vehicles", U.S. Department of Energy Office of Energy Efficiency and Renewable Energy and The Freedom CAR and Fuel Partnership, 22 pages, Sep. 2009.
"Tracking Industrial Energy Efficiency and CO2 Emissions", International Energy Agency, 2007, 82-85.
Denholm, et al., "Grid Flexibility and storage required to achieve very high penetration of variable renewable electricity", Energy Policy, vol. 39(3), 2011, 1817-1830.
Frigo, et al., "Further Evolution of an Ammonia Fuelled Range Extender for Hybrid Vehicles", NH3 Fuel Conference, 23 pages, Sep. 21-21, 2014.
Giamello, "Heterogeneous Catalysis: Teaching an old material new tricks", Nature Chemistry, vol. 4(11), 2012, 869-870.
Haputhanthri, "Ammonia as an alternative transport fuel: Emulsifiers for gasoline ammonia fuel blends and real time engine performance", NH3 Fuel Conference, 24 pages, Sep. 22, 2014.
Inoue, et al., "Highly Dispered Ru on Electride [Ca24Al28O64]4+ (e-)4 as a Catalyst for Ammonia Synthesis", ACS Catalysis, vol. 42(2), Abstract Only, 2014, 676.

(56) References Cited

OTHER PUBLICATIONS

Kaiser, "10 Billion Plus: Why World Population Projections Were Too Low", http://www.sciencemag.org/news/2011/05/10-billion-plus-why-world-population-projection-were-too-low, 2011.

Kitano, et al., "Ammonia Synthesis using a stable electride as an electron donor and reversible hydrogen store", Nature Chemistry, vol. 4, Abstract Only, 2012, 934-940.

Marnellos, et al., "Synthesis of ammonia at atmospheric pressure with the use of solid state proton conductors", Journal of Catalysis, vol. 193(1), Abstract Only, 2000, 80-87.

Matsuishi, et al., "High-density electron anions in a nanoporous single crystal: [Ca21 Al28 O64]4+(4e-)", Science, vol. 301(5633), 2003, 626-629.

Singh, et al., "KRES-ESTM Revamp Makes More Ammonia from Less Natural Gas by Energy Substitution", Session 4, Nitrogen & Syngas Conference, Feb. 21-24, Abstract Only, 2011.

Yiokari, et al., "High-pressure electrochemical promotion of ammonia sysnthesis over an industrial iron catalyst", Journal of Physical Chemistry A, vol. 104(46), Abstract Only, 2000, 10600-100602.

Search Report dated Apr. 28, 2023 in International Patent Application No. PCT/US2023/060785.

Search Report dated May 10, 2023 for International Patent Application No. PCT/US2023/063502.

Fertout, Radia Imane, et al., ""Nickel Supported on Alkaline Earth Metal-Doped γ-Al2O3—La2O3 as Catalysts for Dry Reforming of Methane"", Russian Journal of Applied Chemistry, 2020, vol. 93, No. 2, Abstract; Catalysts preparation, Feb. 2020, 289-298.

Jeong, Soyeon, et al., ""Sulfation and Desulfation Behavior of Pt—BaO/MgO—Al2O3 NOx Storage Reduction Catalyst"", Journal of nanoscience and nanotechnology, vol. 16, No. 5 (2016) 2.1 Catalyst Preparation, May 16, 2016, 4411-4416.

Li, Shuo, et al., ""Study on Catalytic Synthesis of Low Molecular Weight Polyether Polyol by Composite Alkaline Earth Metal"", IOP Conf. Series: Earth and Environmental Science 453 (2020) 012083 vol. 16, No. 5 (2016) 2.2. Preparation of Catalysts, 2020, 4411-4416.

\* cited by examiner

CHEMICAL REACTOR WITH INTEGRATED HEAT EXCHANGER, HEATER, AND HIGH CONDUCTANCE CATALYST HOLDER

CROSS REFERENCE TO RELATED APPLICATION

This application is a continuation of U.S. application Ser. No. 16/766,045, filed on May 21, 2020, which is a U.S. National Stage under 35 U.S.C. § 371 of PCT Application No. PCT/US2018/062295 filed on Nov. 21, 2018, which claims priority and the benefit under 35 U.S.C. § 119(e) to U.S. Provisional Patent Application Ser. No. 62/590,570, filed on Nov. 25, 2017, the entirety of which is hereby incorporated by reference in its entirety.

STATEMENT REGARDING FEDERALLY SPONSORED RESEARCH OR DEVELOPMENT

This invention was made with government support under grant number DE-AR0000685 awarded by the Department of Energy. The Government has certain rights in the invention.

TECHNICAL FIELD

This disclosure relates to a chemical reactor design that integrates a heat exchanger, heater, and catalyst holder into a single piece of equipment. In some embodiments, the chemical reactor disclosed herein is suitable for use in ammonia ($NH_3$) synthesis.

BACKGROUND

The threat to continued economic development and security posed by climate change driven by anthropogenic emissions of carbon dioxide ($CO_2$) is well-known to those skilled in the art. To meet this threat, energy sources that are substantially free of $CO_2$ emissions are highly sought after in both the developed and developing worlds. While several $CO_2$-free energy generation options (e.g. wind, solar, hydroelectric, and nuclear power) have been extensively developed, none presently include a practicable $CO_2$-free fuel.

Ammonia ($NH_3$) can be burned as a fuel according to the following reaction equation (1):

In principle, $NH_3$ can be used directly as a $CO_2$-free fuel or as a hydrogen storage medium if it is thermally reformed into hydrogen and nitrogen gases. However, nearly all current $NH_3$ production processes utilize feedstocks and fuels that produce $CO_2$.

The main industrial procedure for the production of ammonia is the Haber-Bosch process, illustrated in the following reaction equation (2):

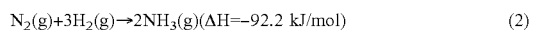

In 2005, Haber-Bosch ammonia synthesis produced an average of about 2.1 tonnes of $CO_2$ per tonne of $NH_3$ produced; about two thirds of the $CO_2$ production derives from the steam reforming of hydrocarbons to produce hydrogen gas, while the remaining third derives from hydrocarbon fuel combustion to provide energy to the synthesis plant. As of 2005, about 75% of Haber-Bosch $NH_3$ plants used natural gas as feed and fuel, while the remainder used coal or petroleum. Haber-Bosch $NH_3$ synthesis consumed about 3% to 5% of global natural gas production and about 1% to 2% of global energy production.

The Haber-Bosch reaction is generally carried out in a reactor containing an iron oxide or a ruthenium catalyst at a temperature of between about 300° C. and about 550° C. and at a pressure of between about 90 bar and about 180 bar. The elevated temperature is required to achieve a reasonable reaction rate. Due to the exothermic nature of $NH_3$ synthesis, the elevated temperature drives the equilibrium toward the reactants, but this is counteracted by the high pressure. In commercial production, waste heat from ammonia synthesis contributes to hydrogen production by steam reforming natural gas.

Recent advances in ammonia synthesis have yielded reactors that can operate at temperatures between about 300° C. and about 600° C. and pressures ranging from 1 bar up to the practical limits of pressure vessel and compressor design. When designed for lower operating pressures, this newer generation of reactors can reduce equipment costs and gas compression costs, but they also reduce the fraction of the $N_2$ and $H_2$ reactants converted to $NH_3$ during each pass through the catalyst bed. This increases the number of recirculations required to make a given quantity of $NH_3$, which can increase the heat loss for a given quantity of $NH_3$ unless the reactor heat is recycled efficiently with an appropriate heat exchanger. The higher number of reactant recirculations can also increase the recirculation pump energy requirements unless a catalyst bed with high gas conductance is used.

There is a need in the art for a $NH_3$ reactor design that (a) integrates the catalyst bed and the heat exchanger to minimize heat losses, (b) integrates a heater to provide make-up heat to the reaction, and (c) uses a high conductance catalyst bed design to reduce reactant recirculation energy requirements. Such a design will reduce capital cost and enable the high recirculation fractions required by low pressure $NH_3$ reactors.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

The present disclosure describes a chemical reactor, such as a chemical reactor suitable for use in producing $NH_3$ from $N_2$ and $H_2$ reactant gases. The chemical reactor described herein integrates a pressure vessel, heat exchanger, heater, and high conductance catalyst bed into a single apparatus to reduce the system size, reduce the system cost, and reduce parasitic heat losses. The chemical reactor described herein can be used to synthesize various compounds from gases using heterogeneous catalysis at elevated pressures and temperatures, including, but not limited to, the synthesis of $NH_3$ from $N_2$ and $H_2$ reactant gases.

These and other aspects of the chemical reactor described herein will be apparent after consideration of the Detailed Description and Figures herein. It is to be understood, however, that the scope of the claimed subject matter shall be determined by the claims as issued and not by whether given subject matter addresses any or all issues noted in the Background or includes any features or aspects recited in the Summary.

BRIEF DESCRIPTION OF DRAWINGS

Non-limiting and non-exhaustive embodiments of the disclosed chemical reactor, including the preferred embodiment, are described with reference to the following figures, wherein like reference numerals refer to like parts throughout the various views unless otherwise specified.

DETAILED DESCRIPTION

Embodiments are described more fully below with reference to the accompanying Figures, which form a part hereof and show, by way of illustration, specific exemplary embodiments. These embodiments are disclosed in sufficient detail to enable those skilled in the art to practice the disclosed embodiments. However, embodiments may be implemented in many different forms and should not be construed as being limited to the embodiments set forth herein. The following detailed description is, therefore, not to be taken in a limiting sense.

Described herein are various embodiments of a single chemical reactor apparatus including a pressure vessel containing a counterflow spiral heat exchanger, a heater, and a catalyst holder. The design is suitable for $NH_3$ synthesis, but it can also be applied to other elevated temperature gas phase heterogeneous catalysis reactions. For purposes of describing the disclosed chemical reactor, reference will be made to use of the chemical reactor in the synthesis of $NH_3$. However, the disclosed chemical reactor should not be construed as being only suitable for use in $NH_3$ synthesis.

Figure 1A:
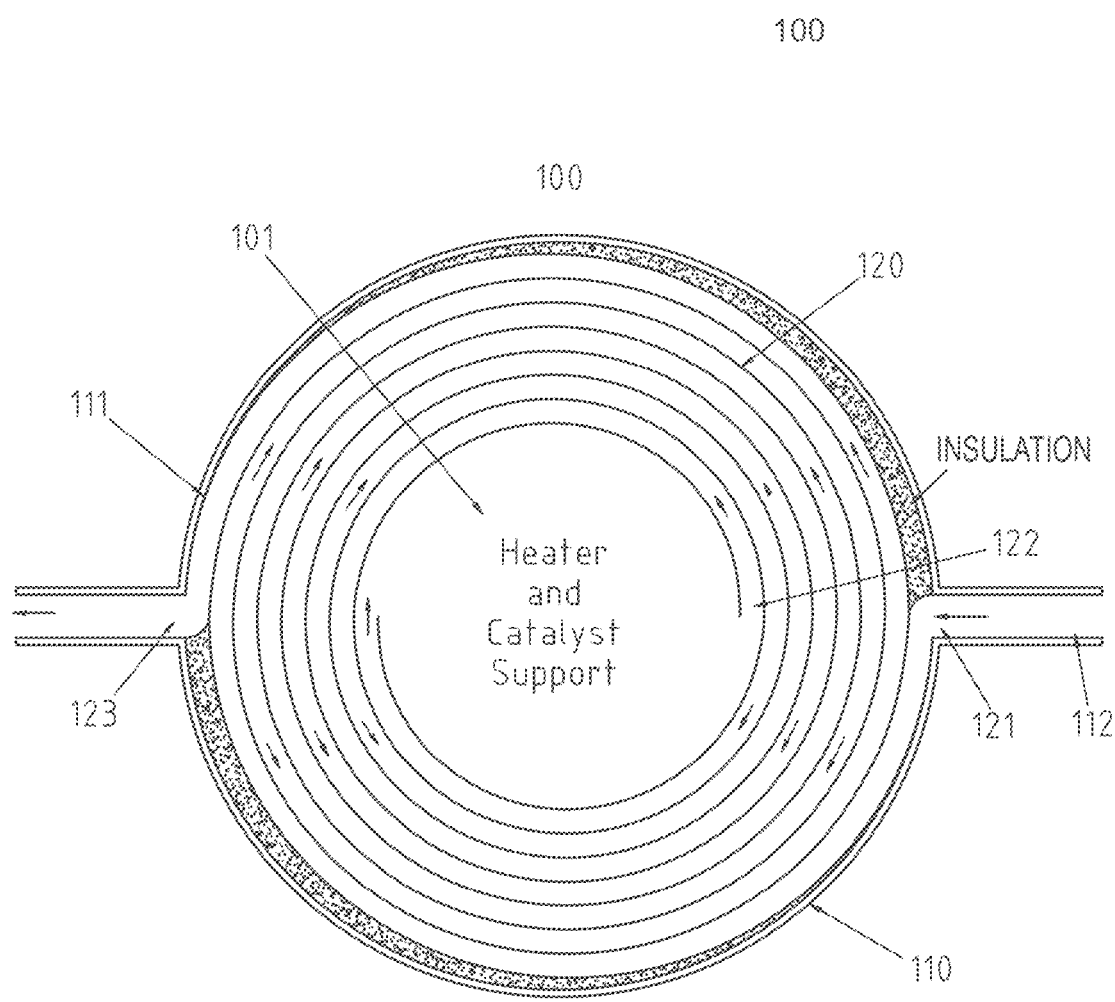
FIG. 1A is a radial cross section view of a combined heat exchanger, heater, and catalyst holder apparatus according to various embodiments described herein.

With reference to FIG. 1A, a radial cross section of an apparatus 100 according to various embodiments described herein is shown. A cylindrical pressure vessel 110 has a spiral heat exchanger 120 attached to its inner surface 111. Reactants gases enter the spiral heat exchanger cold side inlet 121 via a port 112 in the side of the pressure vessel 110 (also labeled "Reactants In" in FIG. 1A). The reactant gases acquire heat as they spiral inward through the spiral heat exchanger 120 to the central region 101 of that apparatus 100, which, as discussed in greater detail below, contains a heater and a catalyst holder (not shown in FIG. 1A).

The heater that can be disposed in the central region 101 as discussed in greater detail below provides heat to the reactants during apparatus warm-up and to make up for parasitic heat losses so they can be maintained at the desired temperature (typically 300-600° C.). The catalyst holder that can be disposed in the central region 101 as discussed in greater detail below is where $NH_3$ synthesis occurs. The catalyst contained in the catalyst holder can be any suitable catalyst to promote the desired reaction. When the desired reaction is ammonia synthesis, the catalyst can include promoted iron ammonia synthesis catalyst, a metal-decorated barium calcium aluminum oxide catalyst, a metal-decorated barium calcium boron oxide catalyst, or a metal-decorated barium calcium aluminum boron oxide catalyst. More specifically, the catalyst can be granular promoted iron ammonia synthesis catalyst, granular or pellet metal-decorated barium calcium aluminum oxide catalyst, granular or pellet metal-decorated barium calcium boron oxide catalyst, granular or pellet metal-decorated barium calcium aluminum boron oxide catalyst, powders of metal-decorated barium calcium aluminum oxide catalyst dispersed on aluminum oxide granules, powders of metal-decorated barium calcium boron oxide catalyst dispersed on aluminum oxide granules, or powders of metal-decorated barium calcium aluminum boron oxide catalyst dispersed on aluminum oxide granules.

After passing through the heater and catalyst holder disposed in the central region 101, the product gases enter the hot side inlet 122 of the spiral heat exchanger 120. As the product gases spiral outward toward the cold side outlet 123 of the spiral heat exchanger 120 (also labeled "Product Out" in FIG. 1A), their heat is transferred to the incoming reactants. The cooled product gases exit the apparatus 100 and flow to other apparatus, not part of the chemical reactor described herein, that extract the $NH_3$ from the product gas stream.

Figure 1B:
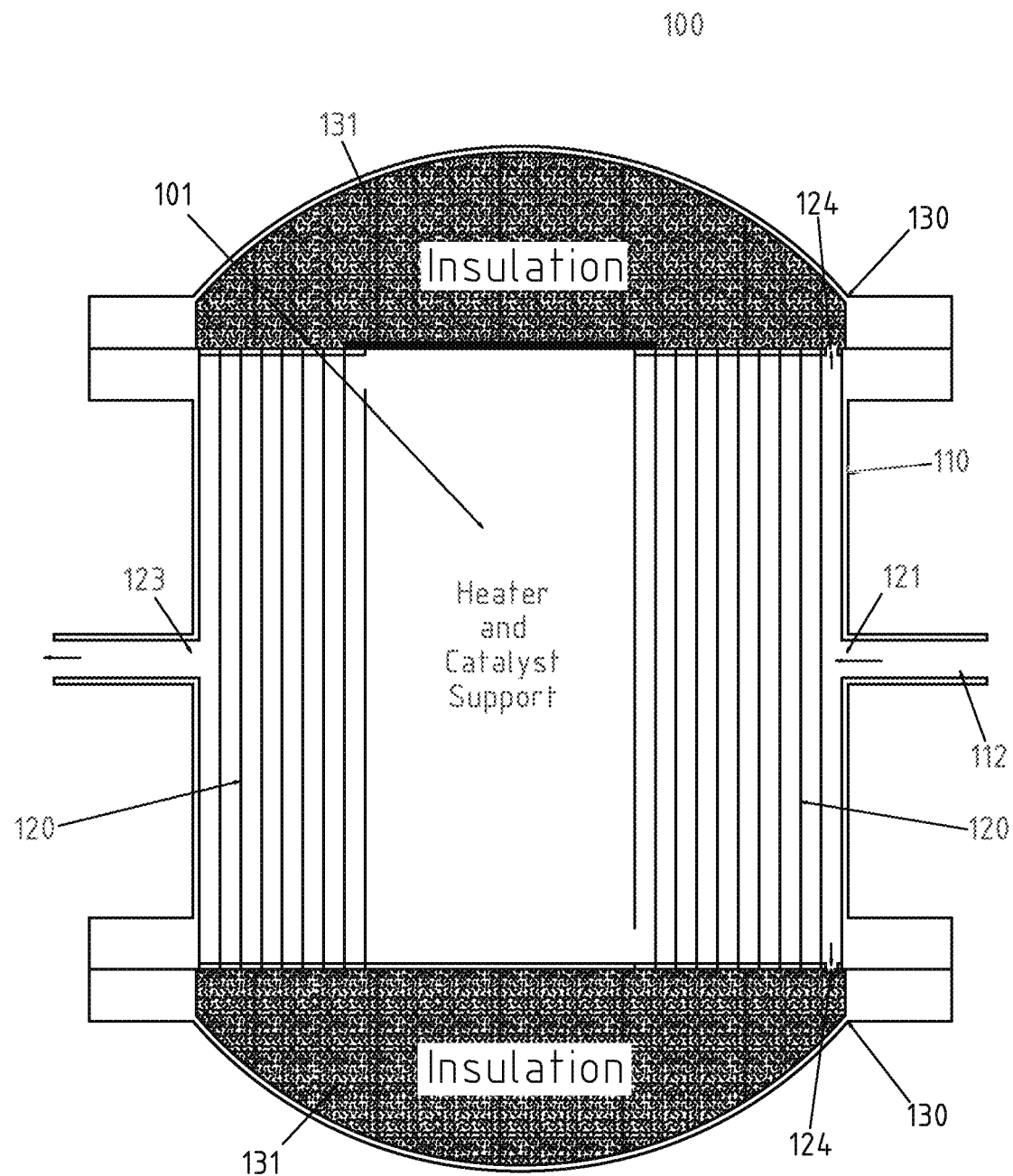
FIG. 1B is an axial cross section view of the combined heat exchanger, heater, and catalyst holder apparatus shown in FIG. 1A.

With reference to FIG. 1B, an axial cross-section view of the combined heat exchanger, heater, and catalyst holder apparatus 100 of FIG. 1A is shown. In this view it is seen that the top and bottom of the pressure vessel 110 are sealed with convex flanges 130. Reactant gases enter the reactor 100 via port 112 (shown on the right side of apparatus 100 in FIG. 1B). Pressure equalization ports 124 in the outer "Reactants In" spiral portion of the spiral heat exchanger 120 allow insulated spaces 131 positioned axially above and below the spiral heat exchanger 120 and under the convex flanges 130 to be pressurized with reactant gases. Locating the top and bottom pressure equalization ports 124 both at the beginning of the reactant inlet spiral of the spiral heat exchanger 120 ensures that they are at the same pressure as the incoming reactants, prevents continuous flow through them, and prevents them from supplying a path for the reactants to bypass the spiral heat exchanger 120, heater (not shown in FIG. 1B), and catalyst holder (not shown in FIG. 1B).

Equalizing the pressure in the insulated spaces 131 and the spiral heat exchanger 120 allows the apparatus 100 to operate under pressure without creating mechanical loads in the heat exchanger spirals of the spiral heat exchanger 120. This is advantageous because it allows the spiral walls of the spiral heat exchanger to be built from thinner sections of material, which reduces the apparatus cost and weight and increases the rate of heat exchange between the Reactant In and Product Out flows. For example, a spiral heat exchanger operating at 10 bar pressure that does not have inner and outer pressures equalized can require steel spirals 0.9 mm thick to bear the pressure-induced stresses, while one with pressure equalization could use 0.1 mm steel spirals because they only have to support the heat exchanger weight. Pressure equalization is also advantageous because it allows the use of highly effective compressible insulating materials, such as mineral wool and ceramic fiber, in the insulated spaced 130. If pressure equalization ports 124 are not utilized, a non-compressible insulation material can be used to transfer force from the catalyst holder (not shown in FIG. 1B) and spiral heat exchanger 120 to the walls of the pressure vessel 110. This can allow the spiral heat exchanger 120 to still be built from thinner sections of material in a manner similar to how thin inner tubes can be inflated to high pressures because the surrounding wheel, tire sidewalls, and tire tread provide mechanical strength.

In operation, cold reactant gas enters the apparatus 100 and cold product gas leaves the apparatus 100. Only the heater (not shown in FIG. 1B), catalyst holder (not shown in FIG. 1B) and regions adjacent to them at the central region 101 of the apparatus 100 are hot. This allows the outer walls of the pressure vessel 110 to remain at ambient temperature. The regions above and below the heater (not shown in FIG. 1B), catalyst holder (not shown in FIG. 1B), and spiral heat exchanger 120 are filled with an insulating material, which allows the top and bottom walls of the pressure vessel 110 to remain at ambient temperature. Keeping the walls of the pressure vessel 110 at ambient temperature is advantageous because it allows them to be built from thinner sections of lower cost materials with lower temperature limits. This reduces the cost and weight of the apparatus 100 compared to one with hot outer walls.

Figure 2:
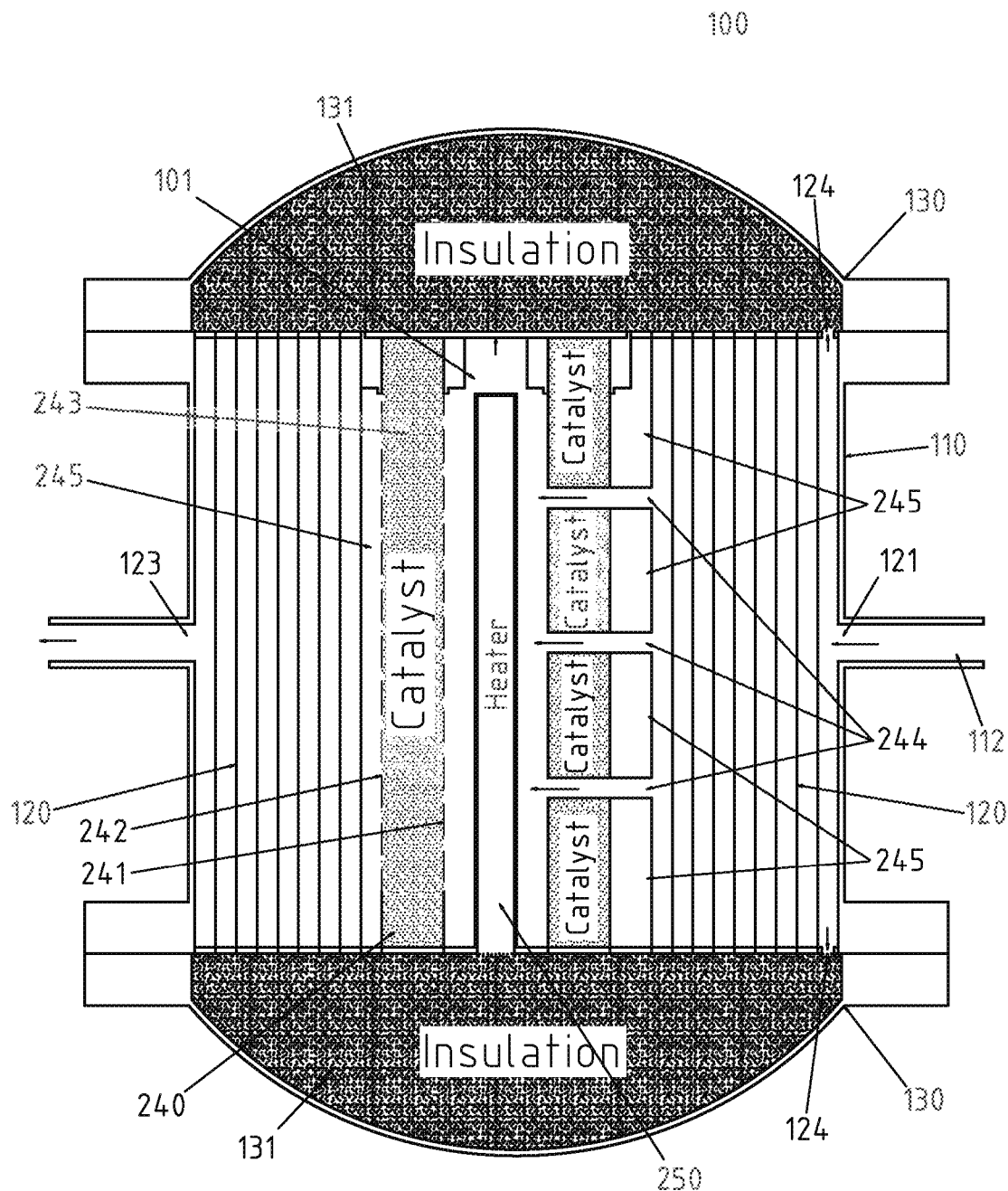
FIG. 2 is an axial cross section view of a combined heat exchanger, heater, and catalyst holder apparatus using a rod-shaped heater and an annular cylinder catalyst holder according to various embodiments described herein.
Figure 3:
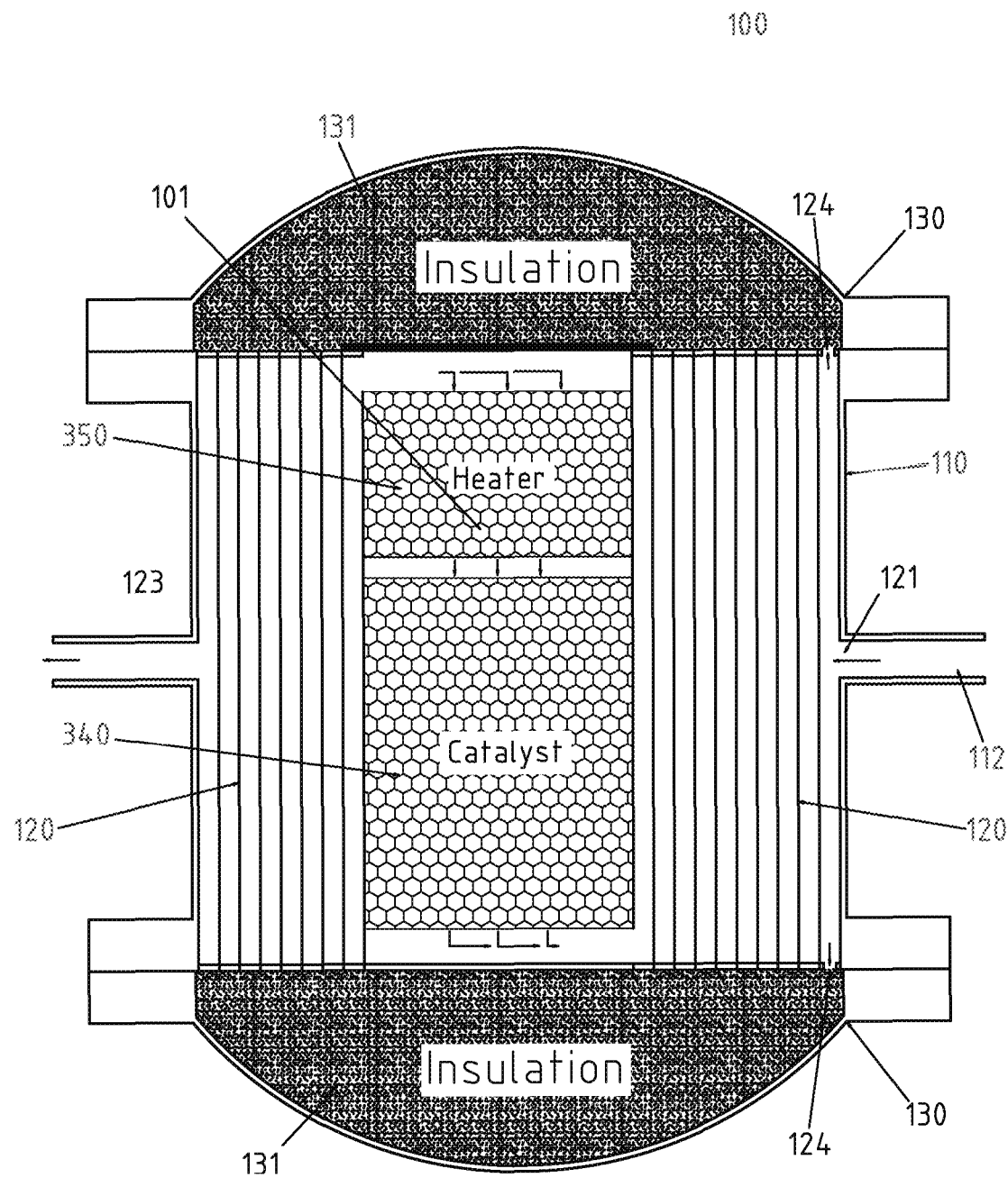
FIG. 3 is an axial cross section view of a combined heat exchanger, heater, and catalyst holder apparatus using a cylindrical heater and a metal monolith catalyst holder according to various embodiments described herein.
Figure 4:
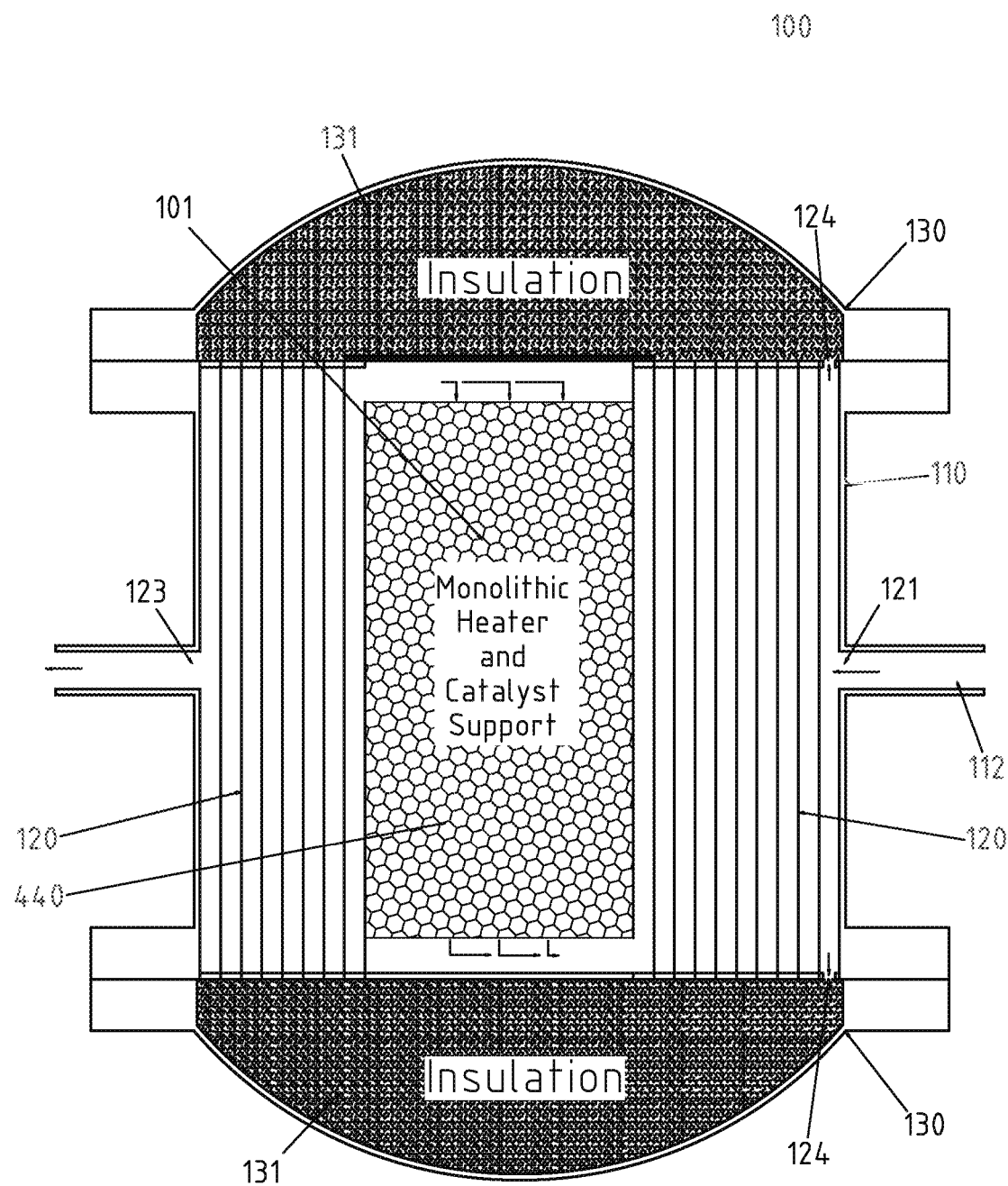
FIG. 4 is an axial cross section view of a combined heat exchanger, heater, and catalyst holder apparatus in which a metal monolith serves as both the heater and the catalyst holder according to various embodiments described herein.

As referenced above, the central region 101 of the apparatus 100 shown in FIGS. 1A and 1B may include a heater and a catalyst holder. The specific configuration of the heater and catalyst holder can be varied. FIGS. 2-4 show various heater and catalyst holder configurations that can be used in the apparatus 100 shown FIGS. 1A and 1B.

With reference to FIG. 2, an axial cross-section view of one heater and catalyst holder configuration embodiment is shown. In this embodiment, the catalyst holder 240 is an annular cylinder with perforated inner walls 241 and perforated outer walls 242. The annular region 243 of the catalyst holder 240 is filled with granular $NH_3$ catalyst. The perforated walls 241, 242 allow gases to flow radially through the catalyst filling the annular region 243. The heater 250 is rod-shaped and located at the center of the annular catalyst holder 240.

In operation, reactant gases enter the reactor 100 via the "Reactants In" port 112 (shown on the right side in FIG. 2). The reactant gas flows through the spiral channels of the spiral heat exchanger 120 toward the central region 101 of the reactor 100. As the reactants flow toward the central region 101 of the apparatus 100, they acquire heat from the products flowing through the spiral heat exchanger 120 toward the edge of the apparatus 100. At the point where the "Reactants In" traveling inwardly through the spiral heat exchanger 120 near the outer side of the catalyst holder 240, the spiral heat exchanger 120 terminates and joints a set of tubes 244 that pass through the annular catalyst holder 240 to deliver heated reactants to the open center of the catalyst holder 240. The reactants impinge on the heater 250 located there, allowing them to be heated if desired. The reactants then flow from the central region 101 (optionally heated via heater 250) of the catalyst holder 240 through the catalyst holder 240, where the $NH_3$ synthesis occurs. The product gases (unused reactants+$NH_3$ reaction product) are collected in the region 245 just outside the annular catalyst holder 240 (also labeled "Product Out" in FIG. 2). They then enter the "Product Out" spiral of the spiral heat exchanger 120. As the product gases flow through the "Product Out" spirals, their heat is transferred to the incoming reactants flowing through the "Product In" spirals. The product gases exit the apparatus 100 via the "Product Out" port 113 (shown on the left side of FIG. 2).

FIG. 3 illustrates another embodiment of the catalyst holder and heater configuration. Reactants enter the apparatus 100 and flow through the spiral heat exchanger 120 toward the central region 101 of the apparatus 100, acquiring heat from the product flow as they do so. At the central region 101 of the apparatus 100, the reactants pass axially through a heater 350 that adds supplemental heat to the reactants if desired. Nonlimiting examples of the heater include honeycomb monoliths, finned spiral rod heaters, or finned serpentine rod heaters, each heated by an electric current.

The fully heated reactants then flow axially into the catalyst holder 340 located axially downstream from the heater 350. The catalyst holder 340 is a honeycomb-like sheet metal or foil monolith coated with $NH_3$ synthesis catalyst, similar to metal monolith automotive catalytic converters. The reactants interact with the catalyst to make $NH_3$, and the resulting product gas and unused reactants enter the "Product Out" spiral of the spiral heat exchanger 120. As the reactants flow toward the outer edge of the apparatus 100 via the "Product Out" spirals of the spiral heat exchanger 120, their heat is transferred to the incoming reactants flowing inwardly through the spiral heat exchanger 120.

FIG. 4 illustrates still another embodiment of the catalyst holder and heater configuration. Gases flow through the apparatus 100 in the same manner as described with respect to FIG. 3. In this embodiment, however, the heater and catalyst holder are combined into a single metal monolith 440. The metal monolith 440 is fabricated from thin sheet metal or foil and is coated with a $NH_3$ synthesis catalyst. The metal monolith 440 is configured so that an electrical current can be passed through it to heat it and the attached catalyst. This is advantageous because it allows the monolith 440 to replace the separate heater 350 depicted in FIG. 3, reducing the apparatus parts count. It is also advantageous because direct bonding of the catalyst to the monolith 440 allows the catalyst to be heated very rapidly, reducing the time required for the apparatus to start producing $NH_3$.

From the foregoing, it will be appreciated that specific embodiments of the disclosed chemical reactor have been described herein for purposes of illustration, but that various modifications may be made without deviating from the scope of the disclosed chemical reactor. Accordingly, the disclosed chemical reactor is not limited except as by the appended claims.

Although the technology has been described in language that is specific to certain structures and material, it is to be understood that the chemical reactor defined in the appended claims is not necessarily limited to the specific structures and material described. Rather, the specific aspects are described as forms of implementing the claimed chemical reactor. Because many embodiments of the chemical reactor can be practiced without departing from the spirit and scope of the chemical reactor, the chemical reactor resides in the claims hereinafter appended.

We claim:
1. A chemical reactor, comprising:
  a pressure vessel;
  a spiral heat exchanger disposed within the pressure vessel, the spiral heat exchanger comprising:
    a central region;
    a reactant-in spiral passageway configured to pass reactant from an inlet port of the spiral heat exchanger to the central region; and
    a reactant-out spiral passageway configured to pass reactant from the central region to an outlet port of the spiral heat exchanger;
  a monolithic heater/catalyst holder component disposed within the pressure vessel and positioned in the central region of the spiral heat exchanger, wherein the monolithic heater/catalyst holder component comprises:

a sheet metal or foil monolith with a honeycomb-like structure and which is configured to be heated by passing an electrical current through the monolith; and a catalyst coating on the honeycomb-like structure of the sheet metal or foil monolith.

2. The chemical reactor of claim 1, wherein an exit end of the reactant-in spiral passageway is located proximate an upstream side of the monolithic heater/catalyst holder component and an entrance end of the reactant-out spiral passageway is located proximate a downstream side of the monolithic heater/catalyst holder component.

3. The chemical reactor of claim 1, wherein the catalyst coating comprises a catalyst that promotes ammonia synthesis.

4. The chemical reactor of claim 1, wherein the catalyst of the catalyst coating is selected from the group consisting of powders of metal-decorated barium calcium aluminum oxide catalyst, powders of metal-decorated barium calcium boron oxide catalyst, and powders of metal-decorated barium calcium aluminum boron oxide catalyst.

5. The chemical reactor of claim 1, wherein the catalyst coating on the sheet metal or foil monolith is metal-decorated barium calcium aluminum oxide catalyst, metal-decorated barium calcium boron oxide catalyst, metal-decorated barium calcium aluminum boron oxide catalyst, or combinations thereof.

6. The chemical reactor of claim 1, wherein the entrance end of the reactant-in spiral passageway further comprises at least one pressure equalization port.

7. The chemical reactor of claim 6, wherein a first pressure equalization port is located at an axial end of the reactant-in spiral passageway and a second pressure equalization port is located at an opposite axial end of the reactant-in spiral passageway.

8. The chemical reactor of claim 6, wherein the at least one pressure equalization port is configured to pass reactant gas in the reactant-in spiral passageway into an insulated space located axially outside the spiral heat exchanger.

9. The chemical reactor of claim 8, wherein the insulated space is filled with compressible insulating material.

10. The chemical reactor of claim 9, wherein the compressible insulating material is selected from mineral wool, ceramic fiber, or a combination of both.

11. The chemical reactor of claim 7, wherein the first pressure equalization port is configured to pass reactant gas in the reactant-in spiral passageway into a first insulated space located axially above the spiral heat exchanger and the second pressure equalization port is configured to pass reactant gas in the reactant-in spiral passageway into a second insulated space located axially below the spiral heat exchanger.

12. The chemical reactor of claim 11, wherein the first insulated space and the second insulated space are filled with compressible insulating material.

13. The chemical reactor of claim 12, wherein the compressible insulating material is selected from mineral wool, ceramic fiber, or a combination of both.

14. The chemical reactor of claim 11, wherein each of the first insulated space and the second insulated space have a domed shape.

* * * * *